Sept. 27, 1949.　　　　　G. T. REICH　　　　　2,483,064
METHOD OF AND APPARATUS FOR COMMODITY
PRESERVATION WITH CARBON DIOXIDE
Filed July 18, 1944　　　　　　　　　　　　　2 Sheets-Sheet 1

Inventor:
Gustave T. Reich
By Pierce + Scheffler
Attorneys.

Sept. 27, 1949. G. T. REICH 2,483,064
METHOD OF AND APPARATUS FOR COMMODITY
PRESERVATION WITH CARBON DIOXIDE
Filed July 18, 1944 2 Sheets-Sheet 2

Inventor:
Gustave T. Reich
By Pierce + Scheffler
Attorneys.

Patented Sept. 27, 1949

2,483,064

UNITED STATES PATENT OFFICE 2,483,064

METHOD OF AND APPARATUS FOR COMMODITY PRESERVATION WITH CARBON DIOXIDE

Gustave T. Reich, Philadelphia, Pa.

Application July 18, 1944, Serial No. 545,522

12 Claims. (Cl. 62—170)

This invention relates to a method and apparatus for the preservation of commodities in storage and cargo spaces and particularly is directed to the utilization of the preservative and refrigerating properties of carbon dioxide in the preservation of commodities. The invention is especially suitable for the preservation of commodities in the cargo holds of ships and will be more particularly described with reference to its use for this purpose.

A system for the utilization of the preservative and refrigerating properties of carbon dioxide, particularly when intended for the preservation of ship cargoes, should operate with the least possible requirement of liquid carbon dioxide and the least possible loss of carbon dioxide from the system in order to reduce to a minimum the compressor capacity and the size of the carbon dioxide purification and recovery apparatus. At the same time, the system should be capable of very great flexibility of operation in order to accommodate the requirements of different commodities and to compensate for widely varying climatic conditions.

One cause of loss of carbon dioxide when used for the preservation of ship cargoes arises from the necessity of replacing the carbon dioxide in the cargo space with air when the cargo is discharged and the replacement of the air with carbon dioxide when the cargo space is reladen. For example, in the case of a steamer having several cargo holds, each with a capacity of 42,500 cubic feet, which are to be cooled by the expansion of liquid carbon dioxide in the hold. The result of the expansion may be all gas or gaseous and solid carbon dioxide. If 5,000 pounds of liquid carbon dioxide are expanded to atmospheric pressure, about 1,150 pounds of solid carbon dioxide and 3,850 pounds of gaseous carbon dioxide are formed. The gaseous carbon dioxide will form with the 42,500 cubic feet of air of the hold 73,500 cubic feet of a mixture containing about 42% of carbon dioxide which will have to be wasted or passed through a carbon dioxide recovery system.

I have found that much of this waste may be avoided and the size of the recovery and compression system greatly reduced, by replacing the air in the cargo space first with stack gases, containing, for example, 10 to 12% of carbon dioxide. By this method alone, in the example given above the gas mixture would contain about 50% of carbon dioxide.

A further decrease in production of diluted gas, avoiding excessive amount of compression when pure uncompressed gas of a high purity is being used for refrigeration and prolonged maintenance of low temperature, may be effected by decreasing the proportion of gaseous carbon dioxide by the judicious use of expansion cooling of liquid carbon dioxide. This is effective both by reducing the amount of gas immediately produced and by making possible a more clean-cut separation of concentrated or substantially pure carbon dioxide from gas too dilute for economical recovery. The latter result is obtained by taking advantage of the stratification of the heavier carbon dioxide which results from the uniform and gradual evaporation of the solid carbon dioxide with a minimum of convective admixture.

Although the proportion of solid carbon dioxide obtainable by the expansion of liquid carbon dioxide at ordinary temperatures cannot exceed about 23%, it has been found that the proportion of solid carbon dioxide can be increased to as high as 50% by precooling the liquid carbon dioxide, for example, by the staged adiabatic evaporation method disclosed in my U. S. Patent No. 2,145,130.

The stratification of the gas may be improved by suitable location of the inlets and outlets. In general, it is preferable to introduce the more concentrated gases, and to deposit the solid carbon dioxide, in the lower portion of the storage space, although this is not essential if a suitable relation between the gas inlets and outlets is maintained.

Loss of concentrated carbon dioxide may be further avoided by replacing the air contained in the storage space by concentrated carbon dioxide gas from a suitable storage or recovery system, or first by either purified or dust-free flue gas and then by uncompressed, purified carbon dioxide which may be concentrated. Similarly, when the storage space is to be emptied, the carbon dioxide may advantageously be displaced first by purified or dust-free flue gas until the carbon dioxide content of the space is reduced to 10 to 15%, and then the flue gas replaced by air, the gases coming from the space being passed to storage, recovery or waste in accordance with the carbon dioxide content thereof and the economic considerations governing the particular installation.

These and other methods of operation, as more particularly described hereafter, may be varied from time to time with varying types of cargo and climatic conditions and also may be varied from one storage space to another, for example, in a ship provided with a plurality of cargo holds.

A principal purpose of the invention is the provision of a flexible and economical system for the utilization of carbon dioxide in the preservation of commodities.

A further purpose of the invention is to provide a system whereby a commodity storage space may be maintained at a predetermined constant temperature with the use of a minimum of liquid carbon dioxide.

Another purpose of the invention is the provision of a system whereby a constant circulation of preservative gas may be maintained through a storage space while maintaining the storage space at any desired temperature.

Another purpose of the invention is the provision of an economical and efficient system for the refrigeration of ships' holds.

Other objects and advantages of the invention will be apparent from the following description.

The invention will be more particularly described with reference to the accompanying drawings in which.

Figure 1:
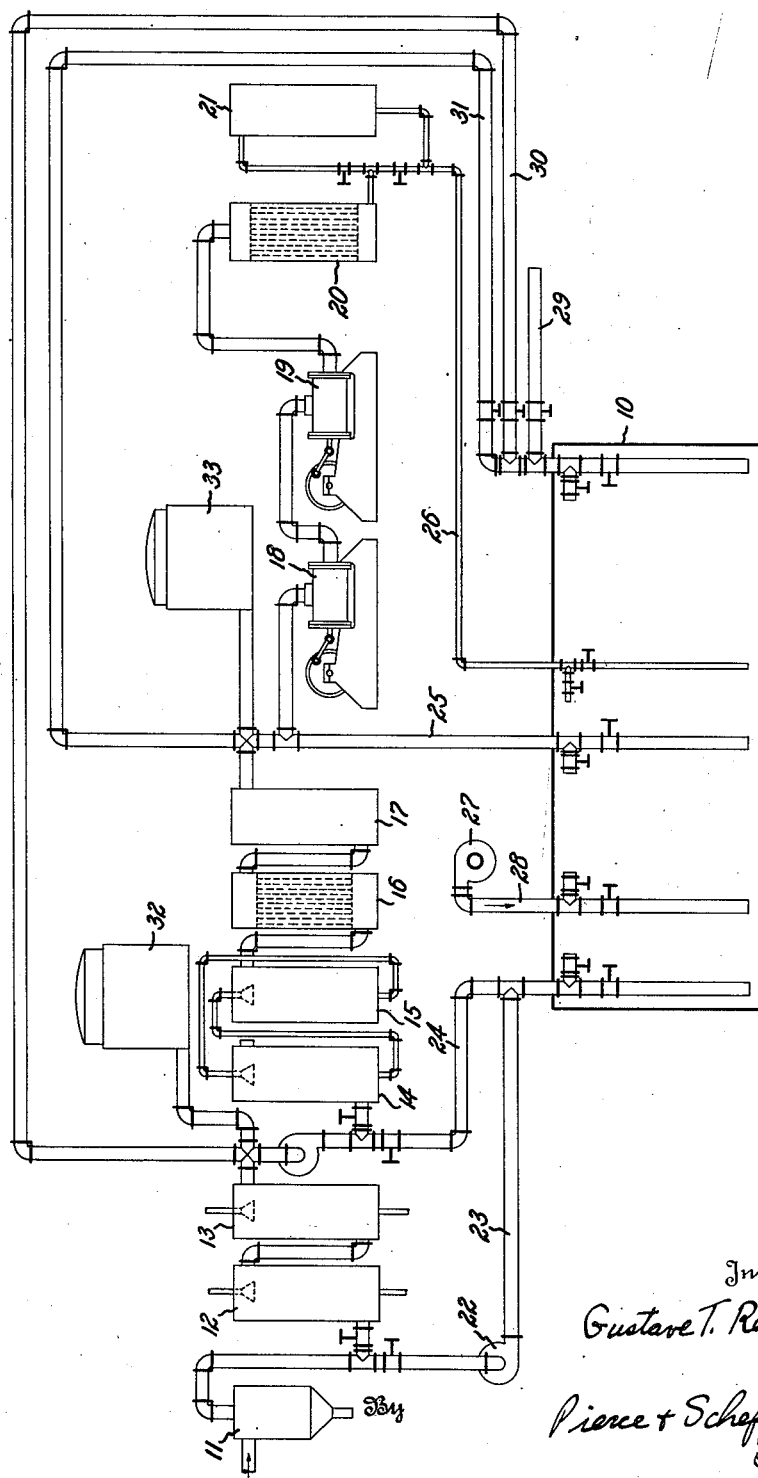
Fig. 1 is a diagrammatic representation of a system for the preservation of commodities embodying the principles of the invention.

In the system illustrated in Fig. 1, 10 is a commodity storage space, which may be one of the cargo holds of a steamer. 11 is a dust collector for the removal of suspended particles from a source of carbon dioxide containing gas, such as flue gas, from the boiler stacks of the steamer, 12 is a lime scrubber and 13 is a soda scrubber in which acid sulfur compounds are removed. 14 is an absorber and 15 a dissociator which are preferably of the type described in my U. S. Patents Nos. 2,142,917; 2,183,324; 2,183,943; 2,205,962; 2,256,962 and 2,257,533. The apparatus and methods of these patents are particularly suitable for shipboard use because of their small space requirements and their relative lack of sensitivity to variations in orientation. Following the dissociator 15, is a cooler 16 and a drier 17.

Dry, concentrated carbon dioxide from the recovery system is compressed in the first and second stage compressors 18 and 19, which may be provided with intercoolers, and condensed to liquid form in cooler 20 according to the usual process. 21 is a supercooler for the liquid carbon dioxide which may advantageously consist of apparatus of the type described in my U. S. Patent No. 2,145,130.

Dust-free flue gas from dust separator 11 may be supplied to the storage space 10 by fan 22 and conduit 23; flue gas free of both dust and acid gases may be supplied through conduit 24; or concentrated carbon dioxide gas may be supplied through conduit 25.

Liquid carbon dioxide is supplied to the storage space, preferably to suitable solid carbon dioxide collectors and sublimers as described hereinafter, through conduit 26.

Air may be supplied to the space by fan 27 and conduit 28.

Gases displaced from the storage space may be passed to waste through conduit 29, for example, if they contain less than 12% of carbon dioxide, to the absorber through conduit 30 if they contain more than 12% of carbon dioxide, or to the compressor through conduit 31 if they contain substantially only carbon dioxide.

Storage reservoirs 32 for carbon dioxide to be concentrated and 33 for pure carbon dioxide, which may be similar to 32 if the carbon dioxide is gaseous or may be a high pressure storage tank for liquid carbon dioxide, are advantageously provided in connection with the absorber and compressor systems, respectively.

It will be seen that the various inlet and outlet conduits are provided with suitable valves and conduit extensions whereby the gases or liquid may be introduced or withdrawn either at the upper or lower part of the storage space, thus providing a very wide range of operating conditions and arrangements to choose from. In general, however, installations for the preservation of commodities in accordance with the principles of the invention will not include all of the apparatus features shown in Fig. 1 but particular combinations and arrangements, especially suited to the particular situation involved, will be utilized.

Some specific arrangements embodying the principles of the invention are illustrated in Figs. 2-6.

Figure 2:
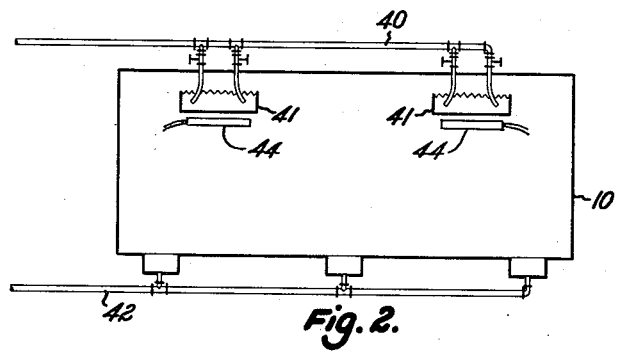
Fig. 2 is a diagrammatic sectional elevation of a commodity storage space showing an illustrative arrangement of carbon dioxide inlets and outlets in accordance with the principles of the invention.

In the arrangement of Fig. 2, liquid carbon dioxide is supplied through pipe 40 to solid carbon dioxide receivers and resublimers 41 located in the upper portion of storage space 10, and air and gas are withdrawn from the lower portion of the storage space through conduit 42. In order to control the rate of sublimation of the solid carbon dioxide deposited in receivers 41, the receivers may be provided with heating means 44, such as electric resistance heaters, automatic temperature and carbon dioxide controls, and automatic discharge valves either connected to the compressor or fans.

Figures 3, 4:
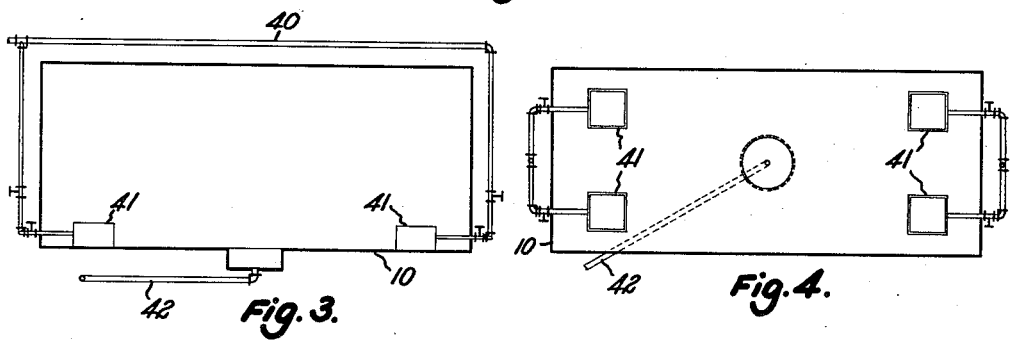
Fig. 3 is a diagrammatic sectional elevation of a storage space showing a modified arrangement of carbon dioxide inlets and outlets.
Fig. 4 is a plan view of the storage space of Fig. 3.

In the arrangement of Figs. 3 and 4, the liquid carbon dioxide is supplied to receivers 41 located in the lower end portions of the storage space, and air and gas are withdrawn at the lower central portion of the space.

Figure 5:
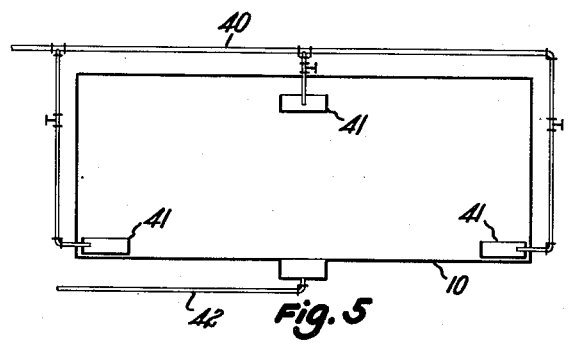
Figs. 5 and 6 are diagrammatic sectional elevations showing further modified arrangements of the carbon dioxide inlet and outlet spaces.

In the arrangement of Fig. 5, liquid carbon dioxide is supplied to receivers 41 located in the lower end and upper central portions of the storage space and air and gas is removed at the lower central portion of the space.

Figure 6:
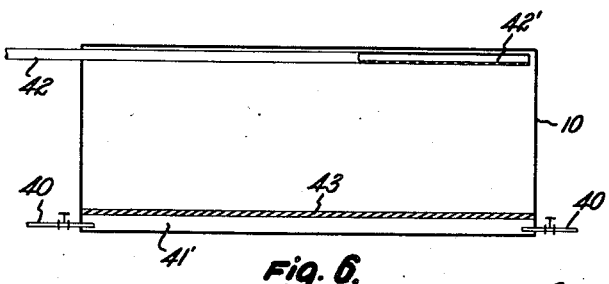

In the arrangement of Fig. 6, liquid carbon dioxide is supplied to a solid carbon dioxide receiving space 41' formed at the bottom of the storage space by perforated false bottom 43. Air and gas are removed at the top of the storage space through perforated conduit 42'.

In each of the arrangements of Figs. 2 to 6, additional gas inlet and outlet conduits, as shown in Fig. 1, may be provided, or the conduits shown in these figures may be utilized for the introduction of air and gaseous and liquid carbon dioxide and for the withdrawal of air and gaseous carbon dioxide.

As an illustration of an efficient method of cooling of a high percentage of carbon dioxide in a cargo hold, I may proceed as follows, especially when perishable products are to be transported which impart an odor to the gas.

First replace the air of the hold completely with dust-free and limestone washed flue gas. Afterward pass the flue gas through the absorber so as to produce carbon dioxide of 99% $CO_2$ or better. Pass this gas into the hold and recirculate it through the absorption system until the desired $CO_2$ content is obtained. This arrangement permits a high carbon dioxide content in the compartment without using a compressor, thereby saving a great deal of expense, especially when the air has to be replaced in several holds at the same time.

When the desired carbon dioxide in the compartment has been obtained, there is thus provided an indifferent gas which will act as a preservative until the desired cooling effect has been achieved. For cooling the compartment the following conditions are desirable. First, quick initial cooling; second, completing the cooling, and third, maintaining the low temperature; finally, removing the gas for replacement with the air. In order to carry out the various steps without overtaxing the compressing system, I may proceed as follows:

First, liquid carbon dioxide without considerable precooling is expanded in the compartment. Owing to the high temperature of the liquid carbon dioxide, approximately 23% of the carbon dioxide will be solid and 77% gaseous. As the compartment already has been charged with pure $CO_2$ from the absorber, cooling will take place, but no dilution. The large amount of gaseous, cold carbon dioxide expanded in the compartment will cool the carbon dioxide already present, very rapidly, and also will permeate every section of the compartment. When sufficient solid carbon dioxide has been formed and the desired temperature in the compartment obtained, the liquid carbon dioxide is then cooled, preferably according to the staged adiabatic evaporation method as disclosed in my U. S. Patent No. 2,145,130.

By cooling the liquid carbon dioxide to approximately $-20°$ F. and expanding it in the compartment, approximately 50% of the liquid carbon dioxide will be converted into solid, and the remainder into gaseous, carbon dioxide. By judicious manipulation we gradually decrease the formation of gaseous, and increase the solid, carbon dioxide. Finally, a state of equilibrium will be reached so that the compartment will be at the proper cooling temperature and sufficient solid carbon dioxide stored. In this way very little or no liquid carbon dioxide will have to be expanded. But the stored solid carbon dioxide will have to be sublimed so as to maintain an adequate supply of gaseous carbon dioxide for gas circulation purposes. Heaters placed near the solid carbon dioxide will sublime it at the proper rate and induce the rise of the gaseous carbon dioxide. Thus, an efficient cooling, storage and sublimation system, as and when desired, is achieved. Consideration must be given also to the fact that quite frequently solid carbon dioxide is in the bottom of the compartment when its content must be discharged. Therefore, a quick sublimation is desirable and the heating unit properly spaced in the solid carbon dioxide hold will convert the solid carbon dioxide into gaseous carbon dioxide, which is removed and recompressed or first absorbed for its storage purposes. Thermo-regulators and proper vents are provided so as to prevent freezing of the cargo, excessive pressure or vacuum if the compartment is to be sealed.

Other advantages of the application of flexible cooling of the carbon dioxide and formation of variable amounts of solid carbon dioxide are that if the cargo space is full I may expand liquid carbon dioxide with little solid carbon dioxide production while, on the other hand, if the cargo space is only partially full, I may produce right at the beginning as much solid carbon dioxide as possible and sublime the latter only. Also, I may expand liquid carbon dioxide at such a rate that it will induce circulation, but very little solid carbon dioxide will be produced by its expansion.

I claim:

1. A system of apparatus for the preservation of commodities comprising in combination with a storage chamber a source of liquid carbon dioxide, a source of dilute gaseous carbon dioxide, and a source of substantially pure gaseous carbon dioxide, conduit means for conveying liquid carbon dioxide from the first of said sources, dilute gaseous carbon dioxide from the second of said sources, and substantially pure gaseous carbon dioxide from the third of said sources into the interior of the storage chamber, and further conduit means providing communication between the interior of the storage chamber at a point spaced from the opening of said first conduit means and the exterior of the storage chamber.

2. A system of apparatus for the preservation of commodities, comprising in combination with a storage chamber purifying means for removing suspended particles and acid sulfur compounds from a gaseous carbon dioxide containing gas, concentrating means for separating the carbon dioxide from said gas, means for liquefying said carbon dioxide, conduit means for conveying liquid carbon dioxide from said liquefying means, and gaseous carbon dioxide from at least one of said purifying and concentrating means, into the interior of said storage chamber, and further conduit means providing communication between the interior of the storage chamber at a point separated from said first conduit means and the exterior of the storage chamber.

3. A system of apparatus for the preservation of commodities, comprising in combination with a storage chamber purifying means for removing suspended particles and acid sulfur compounds from a gaseous carbon dioxide containing gas, concentrating means for separating the carbon dioxide from said gas, means for liquefying said carbon dioxide, conduit means for conveying liquid carbon dioxide from said liquefying means, and gaseous carbon dioxide from at least one of said purifying and concentrating means, into the interior of said storage chamber, and further conduit means providing communication between the interior of the storage chamber at a point separated from said first conduit means and the exterior of the storage chamber and including means for returning gas from said storage chamber to at least one of said purifying and concentrating means.

4. A method of preserving commodities in storage spaces by means of carbon dioxide which comprises expanding liquid carbon dioxide in a portion of the storage space to form gaseous carbon dioxide and solid carbon dioxide in the storage space, withdrawing from a different portion of the storage space gases displaced by the gaseous carbon dioxide formed in the expansion of the liquid carbon dioxide and in the subsequent vaporization of the solid carbon dioxide to provide a constant circulation of carbon dioxide through the storage space, and controlling the rate of evaporation of the solid carbon dioxide by the controlled supply of heat thereto.

5. A method of preserving commodities in storage spaces by means of carbon dioxide which comprises expanding liquid carbon dioxide in a portion of the storage space to form gaseous carbon dioxide and solid carbon dioxide in the storage space, withdrawing from a different portion of the storage space gases displaced by said gaseous carbon dioxide, and subjecting at least a portion of the displaced gases containing more than 10% of carbon dioxide to a selective concentration of the carbon dioxide content thereof.

6. A method of preserving commodities in storage spaces by means of carbon dioxide which comprises expanding liquid carbon dioxide in a portion of the storage space to form gaseous carbon dioxide and solid carbon dioxide in the storage space, withdrawing from a different portion of the storage space gases displaced by said gaseous carbon dioxide, subjecting at least a portion of the displaced gases containing more than 10% of carbon dioxide to a selective concentration of the carbon dioxide content thereof, and controlling the proportion of solid carbon dioxide formed in the expansion of the liquid carbon dioxide within the storage space by varying the temperature of the liquid carbon dioxide supplied to the storage space.

7. A method of preserving commodities in storage spaces by means of carbon dioxide which comprises displacing the air contained in the storage space by supplying in one portion of the storage space gas containing at least a substantial proportion of carbon dioxide while withdrawing from another portion of the storage space the displaced gases, thereafter expanding liquid carbon dioxide in a portion of the storage space to form gaseous carbon dioxide and solid carbon dioxide in the storage space, and withdrawing from a different portion of the storage space gases displaced by the gaseous carbon dioxide formed in the expansion of the liquid carbon dioxide and in the subsequent sublimation of the solid carbon dioxide to provide a constant circulation of carbon dioxide through the storage space.

8. A method of preserving commodities in storage spaces by means of carbon dioxide which comprises replacing the air contained in the storage space with carbon dioxide by supplying in one portion of the storage space gas containing about 10 to 12% of carbon dioxide while withdrawing from another portion of the storage space the displaced gases, thereafter supplying in one portion of the storage space substantially pure carbon dioxide while withdrawing from another portion of the storage space the displaced gases, thereafter expanding liquid carbon dioxide in a portion of the storage space to form gaseous carbon dioxide and solid carbon dioxide in the storage space, and withdrawing from a different portion of the storage space gases displaced by the gaseous carbon dioxide formed in the expansion of the liquid carbon dioxide and in the subsequent vaporization of the solid carbon dioxide to provide a constant circulation of carbon dioxide through the storage space.

9. A method of preserving commodities in storage spaces by means of carbon dioxide which comprises replacing the air contained in the storage space with carbon dioxide by supplying in one portion of the storage space flue gases substantially free from suspended particles and acid sulfur compounds while withdrawing from another portion of the storage space the displaced gases, thereafter supplying in one portion of the storage space substantially pure carbon dioxide while withdrawing from another portion of the storage space the displaced gases, thereafter expanding liquid carbon dioxide in a portion of the storage space to form gaseous carbon dioxide and solid carbon dioxide in the storage space, and withdrawing from a different portion of the storage space gases displaced by the gaseous carbon dioxide formed in the expansion of the liquid carbon dioxide and in the subsequent vaporization of the solid carbon dioxide to provide a constant circulation of carbon dioxide through the storage space.

10. A method of preserving commodities in storage spaces by means of carbon dioxide which comprises replacing the air contained in the storage space with carbon dioxide by supplying in one portion of the storage space gas containing about 10 to 12% of carbon dioxide while withdrawing from another portion of the storage space the displaced gases, thereafter supplying in one portion of the storage space substantially pure carbon dioxide while withdrawing from another portion of the storage space the displaced gases, thereafter expanding liquid carbon dioxide in a portion of the storage space to form gaseous carbon dioxide and solid carbon dioxide in the storage space, withdrawing from a different portion of the storage space gases displaced by the gaseous carbon dioxide formed in the expansion of the liquid carbon dioxide and in the subsequent vaporization of the solid carbon dioxide to provide a constant circulation of carbon dioxide through the storage space, and subjecting at least a portion of the displaced gases containing more than 10% of carbon dioxide to a selective concentration of the carbon dioxide content thereof.

11. The method of preserving edible commodities in the hold of a boat propelled by a power plant using a combustible fuel, said method comprising processing the exhaust gases from such plant and thereby obtaining a gaseous mixture which contains carbon dioxide but is free of liquefied water vapor and combustion products deleterious to said commodities, subjecting the mixture to a refrigeration process on the boat and thereby liquefying the carbon dioxide and discharging the carbon dioxide into the hold under pressure, and in the form of a stream consisting of solidified and gaseous carbon dioxide.

12. A method as defined in claim 11 wherein the solidified carbon dioxide is separated from the gaseous carbon dioxide within the hold and wherein gaseous carbon dioxide is withdrawn from the hold at a point remote from the point of said separation.

GUSTAVE T. REICH.

REFERENCES CITED

The following references are of record in the file of this patent:

UNITED STATES PATENTS

| Number | Name | Date |
|---|---|---|
| 1,933,257 | Goosmann | Oct. 31, 1933 |
| 1,950,180 | Jones | Mar. 6, 1934 |
| 1,951,758 | Jones | Mar. 20, 1934 |
| 2,001,628 | Nierinck | May 14, 1935 |
| 2,016,815 | Gilmore | Oct. 8, 1935 |
| 2,021,073 | Maiuri | Nov. 12, 1935 |
| 2,047,099 | Goosmann | July 7, 1936 |
| 2,309,007 | Parsons | Jan. 19, 1943 |
| 2,337,600 | Harris | Dec. 28, 1943 |

FOREIGN PATENTS

| Number | Country | Date |
|---|---|---|
| 29,601 | Great Britain | Dec. 17, 1909 |
| 128,819 | Switzerland | Apr. 16, 1929 |
| 146,458 | Germany | Nov. 27, 1903 |
| 520,156 | France | June 21, 1921 |
| 642,057 | France | Aug. 21, 1928 |